Nov. 5, 1963 A. J. WOLSKI 3,109,938

SEMI-CONDUCTOR DEVICE HAVING A GAS-DISCHARGE TYPE SWITCHING CHARACTERISTIC

Filed March 19, 1958 4 Sheets-Sheet 1

Inventor
Adolph J. Wolski
By John J. Pederson
Attorney

Inventor
Adolph J. Wolski
By John J. Pedersen
Attorney

Nov. 5, 1963 — A. J. WOLSKI — 3,109,938

SEMI-CONDUCTOR DEVICE HAVING A GAS-DISCHARGE TYPE SWITCHING CHARACTERISTIC

Filed March 19, 1958 — 4 Sheets-Sheet 3

Inventor
Adolph J. Wolski
By John J. Pedersen
Attorney

Inventor
Adolph J. Wolski
By John J. Pederson
Attorney

United States Patent Office 3,109,938
Patented Nov. 5, 1963

3,109,938

SEMI-CONDUCTOR DEVICE HAVING A GAS-DISCHARGE TYPE SWITCHING CHARACTERISTIC

Adolph J. Wolski, Chicago, Ill., assignor to The Rauland Corporation, a corporation of Illinois Filed Mar. 19, 1958, Ser. No. 722,517
27 Claims. (Cl. 307—88.5)

The present invention relates to semi-conductor devices. More particularly, it has to do with semi-conductor switching or trigger devices.

Various switching devices are finding widespread use in computers, industrial controls, and the like. The operation of many switching devices involves the presence of two operational states, a conducting state and a non-conducting state, the two states often being coupled by a transition region which displays a negative resistance. Such a device finds utility in oscillator circuitry and in monostable, astable and bistable trigger circuits.

In semi-conductor switching devices, several different principles of operation have been utilized. Switching effects have been obtained by providing means for suddenly increasing the injection of minority carriers at one electrode of the device, by multiplication of conduction carriers through field ionization and/or avalanche effects, by appropriate changes of polarity, and by a combination of different ones of these techniques.

Presently known semi-conductor switching devices are of both two and three-terminal varieties, the third terminal usually serviing as a control electrode. The two-terminal devices generally take advantage of avalanche breakdown in order to institute switching action. In one such unit, phosphorus and boron are diffused from opposite sides into p-type silicon to form an n+-p+ device in which the breakdown voltage decreases with resistivity of the silicon and with the depth of the junction; that is, the breakdown voltage decreases with a decreasing impurity gradient in the junction. In another two-terminal device, a slab of intrinsic germanium is provided with a first conventional p-n junction and with a second alloy junction formed from a pellet of gold including a minor portion of antimony; the latter junction constitutes a highly doped n-i region. In still another commercially available two-terminal device, silicon is used as the base material and is transformed into a four-layer p-n-p-n structure by a combination of diffusion and alloying techniques.

Semi-conductor switching devices can also take the form of three-terminal units. One such device, displaying a thyratron characteristic, includes a slab of germanium having an ohmic base contact, an alloy p-n junction emitter with a low reverse-current characteristic and good injection efficiency, and a point-contact collector; the device yields a current gain of four or better and has a linearly decreasing reverse-current characteristic. Similarly, a conventional point-contact transistor may be operated as a switching device; however, its emitter injection efficiency is much lower and the action is therefore of lesser magnitude.

Another multiple-terminal switching device takes the form of a p-n junction diode having a large space charge region to which a small p-type contact is bonded. It has been suggested that this space charge region may be further improved by means of non-constant doping to decrease the resistivity therein. The switching action observed is apparently due to avalanche multiplication of holes injected by the bonded contact into the heavily doped (n+) space charge region.

Another three-terminal device displaying a thyratron characteristic is similar to the first three-terminal device described above and includes an ohmic base contact, a p-n junction, and, instead of a point-contact collector, a combination of an alloy junction and a point contact inside or close to the junction and electrically connected to it. It has been suggested that the point contact spoils the junction by rendering it conductive in the reverse direction with a linear dependence on collector voltage.

There is some indication in the art that some conventional transistors may be caused to display a thyratron characteristic by suitable forming. Such units are usually unstable and subject to aging of their characteristics. Conventional alloy-junction transistors have also exhibited a switching characteristic when operated in an avalanche region. This mode of operation, sometimes referred to as "the delayed collector conduction mode," is substantially different from that of a thyratron-type transistor. In the latter, the unit breaks down to its "on" state at a low "hold on" voltage regardless of the bias applied to the base of the unit. In delayed-collector-conduction operation the breakdown is the same as in the avalanche-type diode; the hold-on voltage is a function of the base bias and may be of relatively high magnitude. In thyratron-type transistors, the base retains little or no control after the unit is switched to its on-condition.

It will be readily apparent that a thyratron characteristic, for which only a small hold-on voltage is required to maintain the device in its on-state after switching, presents distinct advantages in many circuit applications as compared with other devices that require a comparatively larger hold-on voltage which usually is a function of the base bias. The prior-art thyratron-type devices employing a point contact entail serious manufacturing problems because of the accurate positioning usually required for the point contact and the difficulties encountered in properly engaging the contact with the body of the device; such devices may be somewhat more subject to damage through mishandling, vibration, and the like than other types of semi-conductor devices.

It is a principal object of the present invention to provide a semi-conductor device suitable for use in switching circuits and which overcomes one or more of the aforementioned disadvantages of prior art semi-conductor devices of a similar character.

Another object of the present invention is to provide a semi-conductor device structurally resembling a conventional alloy-junction transistor but exhibiting switching properties heretofore found in such devices as point contact and so-called thyratron transistors.

A further object of the present invention is to provide a new and improved semi-conductor device of the alloy-junction variety which exhibits a collector reverse current changing with voltage, a current gain greater than one, and a high emitter hole-injection efficiency.

Still another object of the present invention is to provide a new and improved semi-conductor device displaying a thyratron switching characteristic, which is simple and economical to manufacture, and which for its manufacture requires only the use of techniques and apparatus designed for the production of conventional alloy-junction transistors.

A still further object of the present invention is to provide a new and improved semi-conductor device of a two-terminal variety which displays a switching breakdown in its operating characteristics, which is stable and rugged, and which may be manufactured with conventional alloy-junction apparatus and techniques.

Another aim of the present invention is to provide a new and improved semi-conductor device displaying a somewhat symmetrical thyratron switching characteristic whereby switching action is obtainable in either of two opposite quadrants as shown by a conventional biaxial representation of the device characteristics.

A semi-conductor device of the present invention may include a body of semi-conductive material such as n-type germanium. An alloy-junction region on a first surface of the n-type germanium body is formed from a material comprising a first modifier of n-type conductivity and a second modifier of p-type conductivity and having a segregation constant in the germanium greater than that of the first modifier and a diffusion coefficient in the germanium lower than that of the first modifier. An electrode is joined to another surface on the body. In its broadest aspects, the invention pertains to the selection of materials in a manner corresponding with the foregoing and without limitation as to the identity of a particular material.

In accordance with further aspects of the invention, a second junction region similar to that of the first is included; in this form, the device finds utility either with or without an electrode joined to the body at another location. In another form a diode junction is disposed on the body in addition to the first junction region; different advantageous results are obtained with and without an additional electrode joined to the body.

While the present invention finds distinct utility in several different forms, in each instance the semi-conductor device includes at least one junction region of a special nature; this region is formed from a material including at least two modifiers of opposite conductivity types and preferably contained in a carrier in which the material of the body, with which the alloy junction is formed, is soluble. The material of the body has a conductivity type opposite that of the modifier having the larger segregation constant.

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements and in which:

Figure 4:
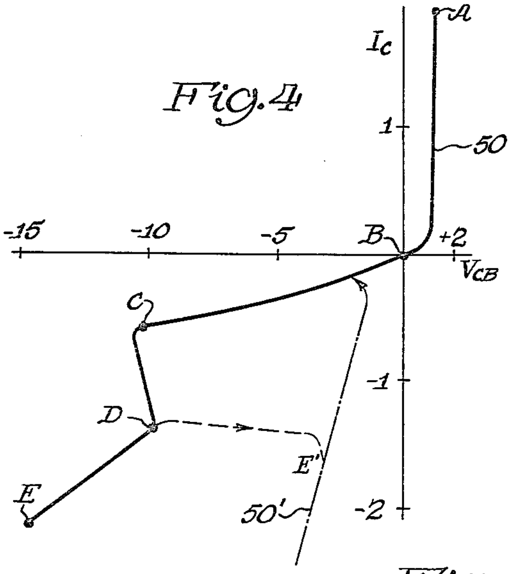
FIGURES 4, 5 and 6 depict curves illustrating operating characteristics of devices constructed in accordance with the present invention.
Figure 5:
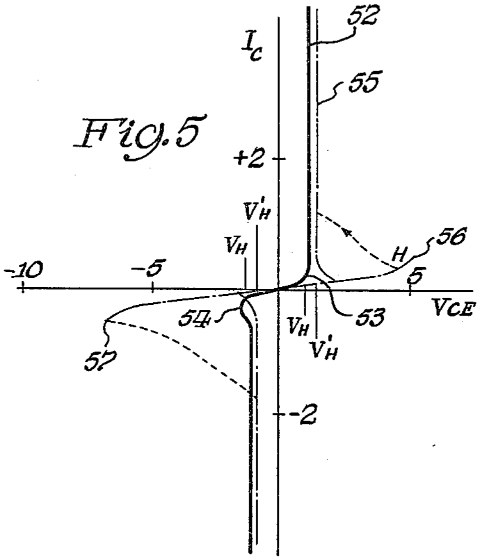
Figure 4A:
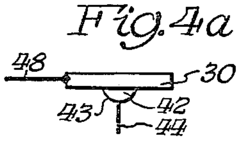
Figure 5A:
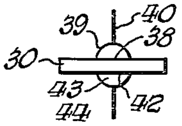
Figures 6, 7:
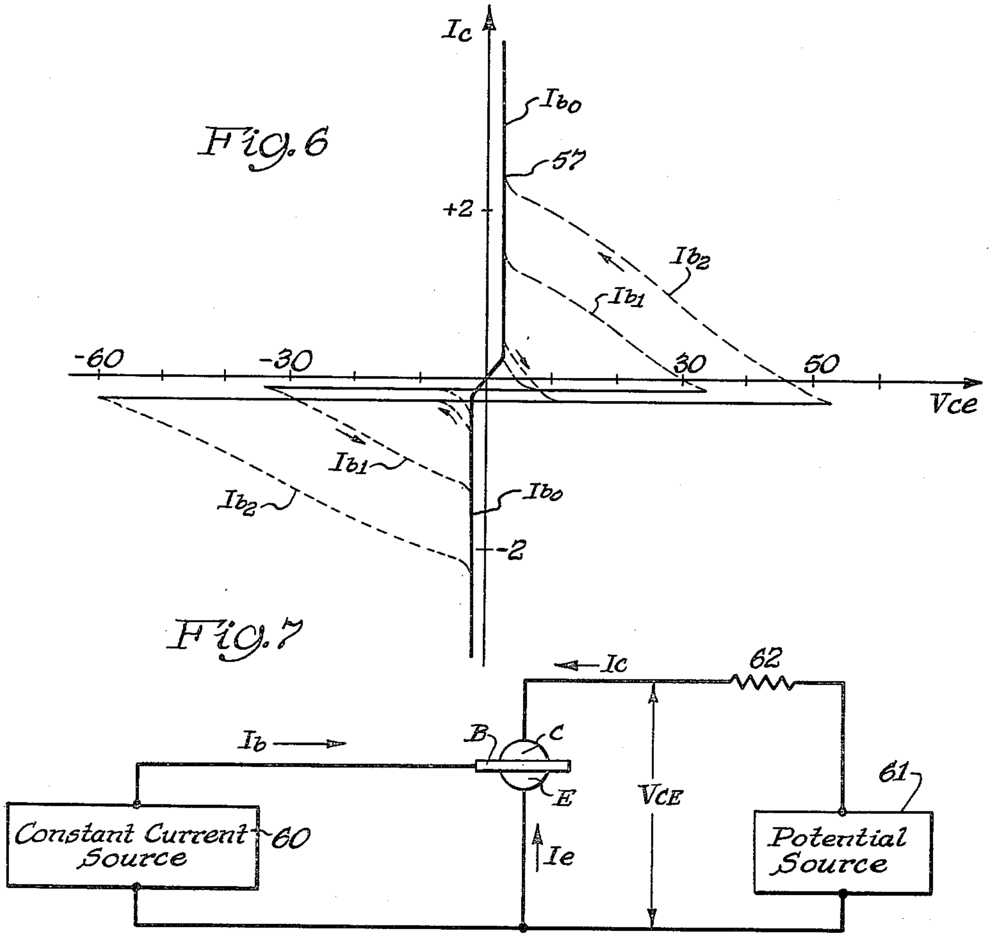
Figure 8:
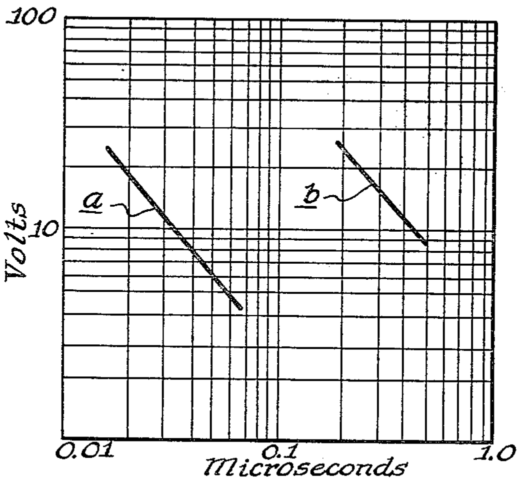
Figure 9A:
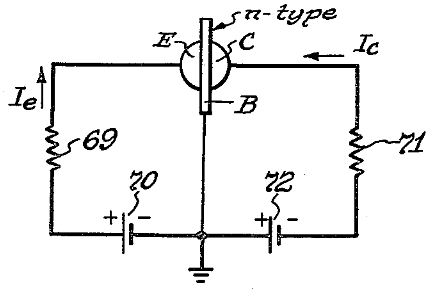
Figure 9B:
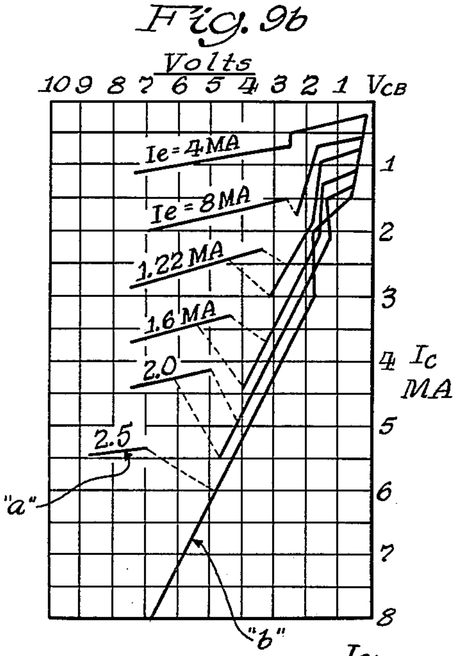
Figure 9C:
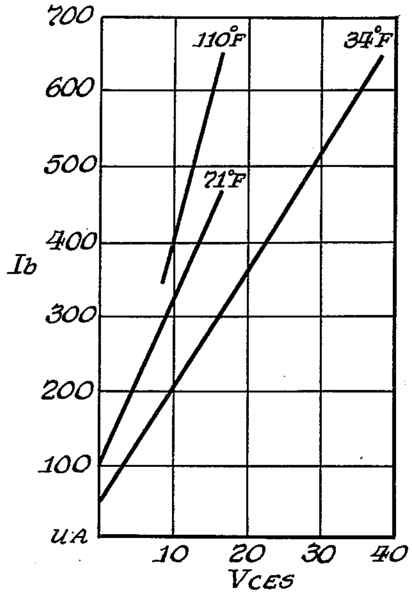
Figure 10:
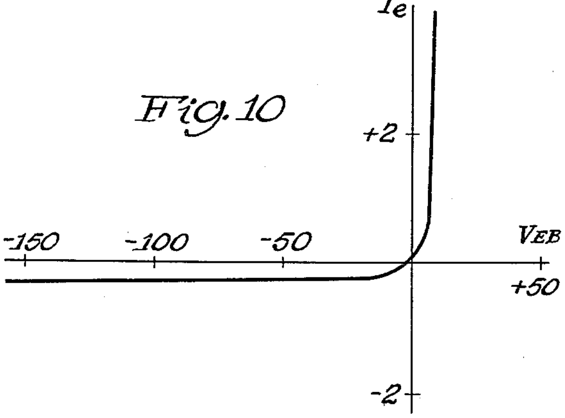
Figure 11:
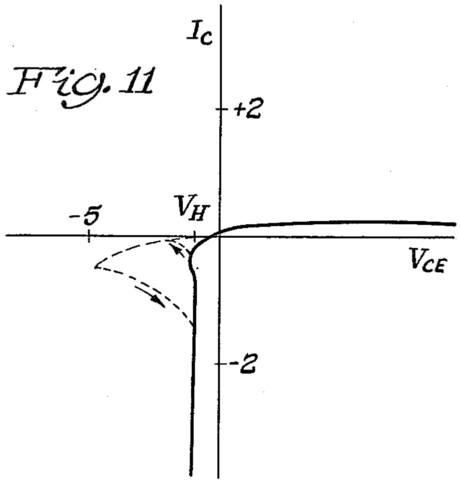
Figure 12:
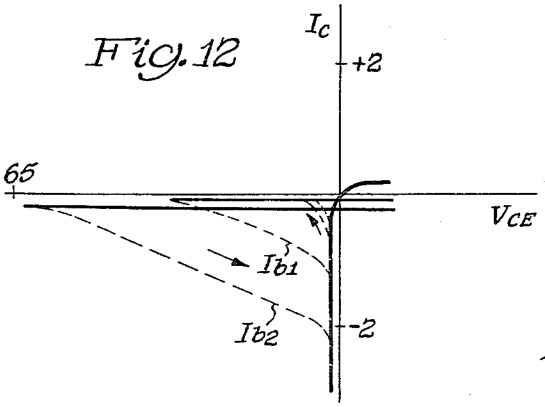
Figure 11A:
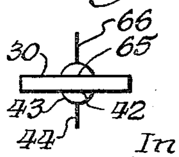
Figure 12A:
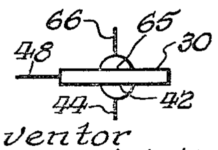
Figure 13:
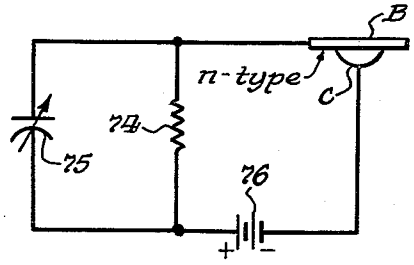
Figure 14:
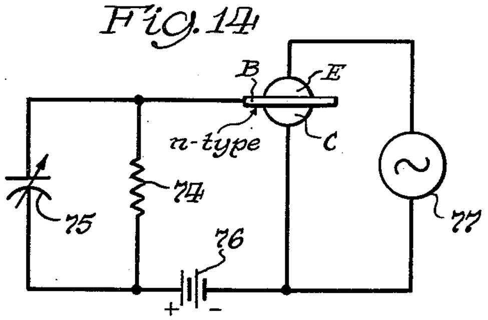
Figure 15:
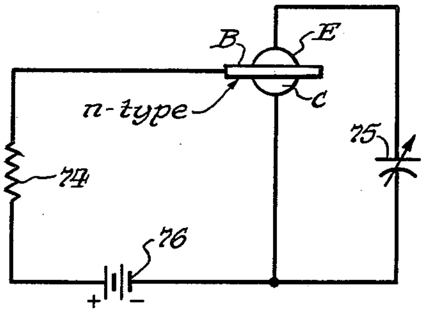
Figure 16A:
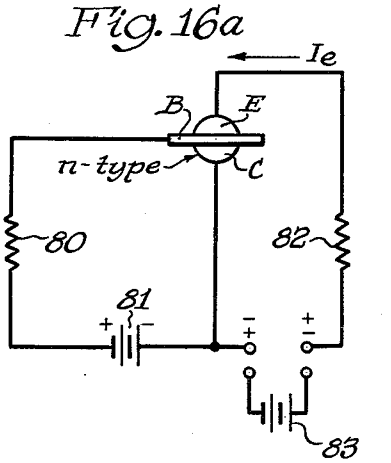
Figure 16B:
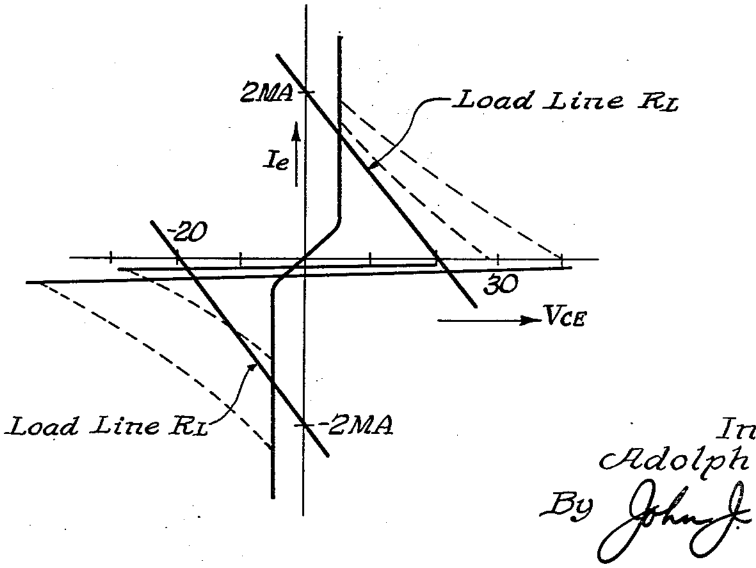

FIGURES 4*a* and 5*a* schematically illustrate the devices from which the curves of FIGURES 4 and 5, respectively, were derived;

FIGURE 7 is a schematic wiring diagram of a circuit utilized to produce the characteristic curves shown in FIGURE 6;

FIGURE 8 is a curve illustrating switching times of devices of the present invention;

FIGURE 9*a* is a schematic wiring diagram of a circuit employing a device embodying the invention;

FIGURE 9*b* is a graphical representation of operating characteristics derived from the circuit of FIGURE 9*a* and illustrating a particular mode of operation of a device of the present invention;

FIGURE 9*c* is a graph illustrating the effect of temperature changes upon the operation of a device of the invention;

FIGURES 10, 11 and 12 are curves illustrating certain operating characteristics of devices constructed in accordance with the present invention;

FIGURES 11*a* and 12*a* schematically illustrate devices corresponding to those from which the curves of FIGURES 11 and 12, respectively, were obtained;

FIGURE 13 is a schematic wiring diagram of a circuit employing a device of the present invention;

FIGURE 14 is a schematic wiring diagram of another circuit employing a device of the invention;

FIGURE 15 is a schematic wiring diagram of still another circuit taking advantage of the characteristics offered by a device of the present invention;

FIGURE 16*a* is a schematic wiring diagram of yet another circuit utilizing a device of the present invention; and FIGURE 16*b* is a graphical representation of unique operational characteristics of the device, as reflected in the circuit of FIGURE 16*a*.

Figures 1, 2, 3:
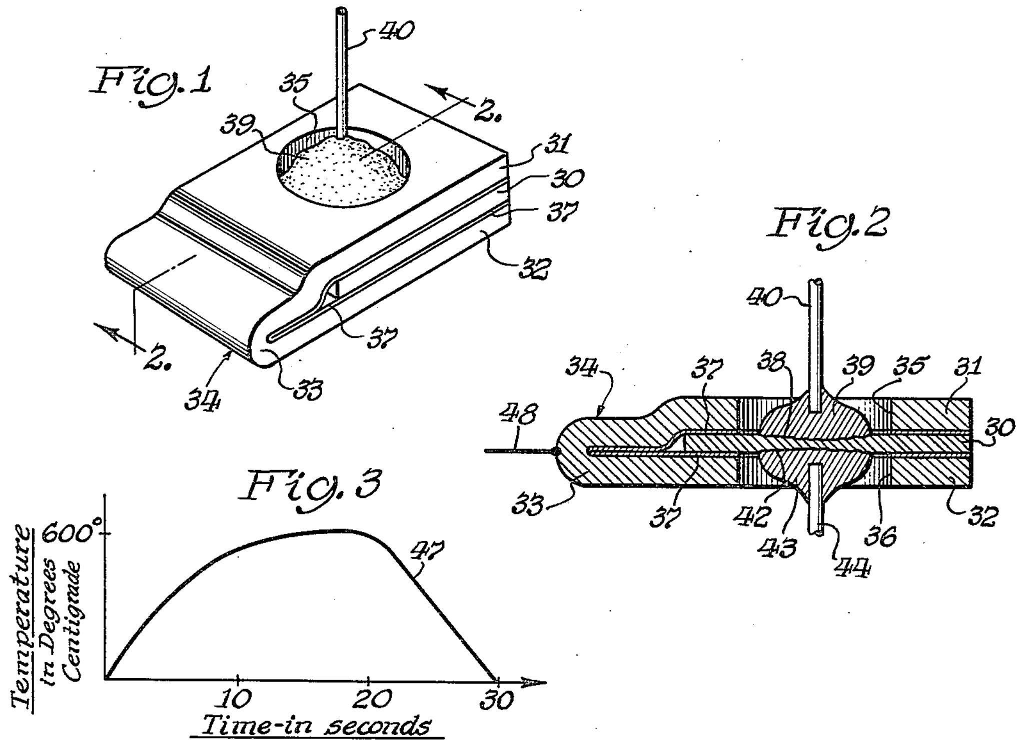
FIGURE 1 is a perspective view of a semi-conductor device constructed in accordance with the present invention.
FIGURE 2 is a cross-sectional view taken along line 2—2 in FIGURE 1.
FIGURE 3 is a curve depicting a time-temperature cycle suitable for use in the manufacture of the device shown in FIGURE 1.

In the embodiment of the present invention shown in FIGURES 1 and 2 for purposes of illustration, a wafer or base 30 of semi-conductor material having a predetermined conductivity type is sandwiched between two legs 31 and 32 which project from the closed end-portion or bight 33 of a generally U-shaped conductivity base member or tab 34. Legs 31 and 32 are disposed in substantially parallel planes to define a space therebetween. Coaxially disposed in legs 31 and 32 are respective transverse apertures 35 and 36, preferably circular and of equal size. The inner surfaces of legs 31 and 32 are preferably surfaced with a coating 37 of tin or the like which, during manufacture of the device, is melted to solder wafer 30 to base tab 34 and thereby insure good electrical and mechanical contact.

Centrally disposed coaxially within aperture 35 and electrically and mechanically joined at junction 38 to the surface of wafer 30 exposed within aperture 35 is a mass of junction-forming material 39. Material 39 includes at least one modifier impurity of a conductivity type opposite that of wafer 30 and another modifier impurity of a conductivity type the same as that of wafer 30. The first-mentioned modifier impurity has a segregation constant in the material of which the wafer is composed higher than that of the last-mentioned other impurity. Both these modifiers preferably constitute a minor percentage by weight of a mixture including a carrier for the modifiers. The carrier may also be a modifier in which case its segregation constant is very small; it may alternatively be a neutral material such as tin or a mixture of tin and the additional modifier. The carrier is a material which dissolves the material of wafer 30.

Different modifiers have been found to exhibit different segregation constants so that during the formation of an alloy junction one modifier crystallizes out in greater amounts than or in advance of another modifier. To illustrate, the modifier antimony has a higher segregation constant than indium in germanium. Hence, in a junction forming process of the alloy junction type the antimony tends to segregate out more readily than the indium. Typical segregation constants in germanium are as follows:

| | |
|---|---|
| Acceptors: | |
| Indium | 0.001 |
| Aluminum | 0.10 |
| Gallium | 0.10 |
| Donors: | |
| Arsenic | 0.03 |
| Antimony | 0.003 |

While various known apparatus may be employed to form junction 38, it may be formed using the apparatus described in the copending application of Robert G. Pohl, entitled Apparatus for Manufacturing Semi-Conductor Devices, Serial No. 650,450, filed April 3, 1957, and assigned to the same assignee as the present invention. To form the junction, material 39 is applied to or placed upon a surface of wafer 30 after which the material and surface are heated in accordance with a predetermined time-temperature cycle. Preferably, material 39 is first formed into a small pellet and then is melted on to one end of a piece of wire later to serve as a connecting lead to the junction. The resultant blob of material 39 on the end of the wire is brought against a portion of the surface of wafer 30 within aperture 35 and heat is applied for a length of time at a temperature to form an alloy junction. Upon subsequent cooling, the junction is formed and lead wire 40 projects upwardly away from the unit to serve as an electrode.

A similar technique may be employed to form a second junction 42 on the side of wafer 30 opposite junction region 38. Thus, coaxially disposed within the other aperture 36 is a body of material 43 electrically joined to wafer 30, and protruding outwardly from the material 43 is an electrode lead 44 to which a suitable electrical connection is made when the device is placed in use.

In the preferred embodiment of the present invention, junction 42 is formed from the same material in accordance with the same technique employed for the formation of junction 38. Thus, material 43 initially comprises a first modifier having a conductivity type the same as that of wafer 30 and a second modifier having a conductivity type opposite that of wafer 30, the latter having a segregation constant greater than that of the first modifier. To form junction 42, a pellet or other small mass of material 43 is placed against the surface of wafer 30 within aperture 36, preferably after having previously been formed onto lead wire 44. As before, heat is applied for a period of time at a temperature to form an alloy-junction.

For the heating step, base tab 34 with wafer 30 inserted therein may be placed between the jaws of a pair of heating elements and the entire unit, preferably disposed in a hydrogen atmosphere, is thereby brought to a temperature corresponding generally to that employed for the formation of conventional indium-germanium junctions in present day alloy-junction transistors. A suitable time-temperature cycle is illustrated by curve 47 of FIGURE 3 in which temperature in degrees centigrade is plotted along the ordinate and time in seconds is plotted along the abscissa. As indicated, the temperature rises very quickly toward 600 degrees during the first ten seconds, reaches about 600 degrees at the end of twenty seconds, and then is permitted to rapidly decline to substantially ambient temperature by the end of thirty seconds total elapsed time. To aid in rapid cooling during the last ten seconds, it is preferred that the heating elements, in contact with the base tab be water cooled; such is the character of the apparatus described in the aforementioned copending Pohl application.

Units displaying comparable quality and of the same essential characteristics have also been produced by an alternate heating technique. In accordance with the latter, the assembled devices are placed in an oven of the conventional type regularly used for making ordinary junction transistors. The heating cycle in this case is somewhat longer. For example, the device may be placed in an oven at 550 to 570 degrees centigrade; it will reach that temperature within 15 to 20 minutes. It is then removed to room temperature when it is cooled for about 20 minutes. The actual recrystallization takes perhaps 4 minutes.

For a typical device manufactured in accordance with the invention, wafer 30 is of n-type germanium having a resistivity of about ten ohm-centimeters. Wafer 30 is 0.075 inch square and 0.0025 inch thick; in a number of devices having essentially the same characteristics, the thickness has ranged from 0.0015 to 0.004 inch and the resistivity has ranged from 7 to 40 ohm-centimeters. Base tab 34 is formed from a sheet of nickel 0.01 inch thick bent generally into the shape of U to define a space between legs 31 and 32 approximately 0.003 inch wide to receive wafer 30, the inner surfaces of legs 31 and 32 being precoated with a layer 37 of tin 0.005 inch thick which serves to solder base tab 34 to wafer 30 during the alloying of the junction. Tin layer 37 may include minor portions (e.g. 5% by weight) of a donor such as antimony to form a more perfect ohmic contact. Apertures 35 and 36 are centrally disposed in each leg and are each 0.045 inch in diameter. The finished base tab is 0.075 inch wide and 0.105 inch long.

The junctions for the above described 0.075 x 0.075 x 0.0025 inch wafer are both formed from modifier pellets cylindrical in shape, 0.015 inch diameter and 0.010 inch thick. Leads 40 and 44 are of stainless steel 0.002 inch in diameter. For a larger size germanium wafer, 0.250 x 0.250 x 0.010 inch, used in higher power devices having the same essential characteristics, the pellets are 0.156 inch in diameter and 0.020 inch thick; for such devices, base tab 34 has been dispensed with and the connecting lead is soldered directly to wafer 30 near one edge thereof using a mixture of 95% tin and 5% antimony, by weight.

After completion of the junction formation, the assembly is etched in a solution commonly referred to as CP4 and which consists of, by volume, 15 parts of concentrated (46% in water) hydrofluoric acid, 15 parts glacial acetic acid, about 25 parts of concentrated nitric acid, and one part of liquid bromine. After the etching, a suitable lead is electrically connected as by spot welding to base tab 34 and the entire assembly is then encapsulated within a metal can (not shown) with the three leads respectively connected to three terminals extending through a conventional base pass sealed across the lip of the can.

Preferably, the pellets of junction forming material 39 and 43 are prepared by placing the constituents into a quartz ampoule within an oven which is evacuated to a pressure of less than $10^{-4}$ millimeters of mercury and then sealed off. The ampoules are quickly heated (within 5 minutes) above the melting point of both ingredients while undergoing constant vibration, at perhaps 120 cycles per minute, after which they are quenched in cold water. The resultant material is then rolled down to form a foil of the desired thickness from which the pellets are subsequently punched.

While various specific examples will be given below, for the typical type device presently under discussion the pellet material contains primarily indium as a carrier with minor proportions of antimony as a donor and gallium as an acceptor. As noted above, gallium has a segregation constant much higher than that of indium and substantially higher than that of the antimony.

The operation of the devices produced in accordance with the present invention will best be understood by first referring to FIGURE 4 in which curve 50 depicts a diode characteristic of either of the two junctions 38 and 42. This curve is obtained by connecting a voltage source between one of the leads 40 and 44, on the one hand, and lead 48 to the base tab on the other. When the selected junction, termed the collector, is biased positively with respect to the base, the device exhibits a very low resistance as indicated by portion AB of curve 50 in quadrant 1 (voltage is plotted along the abscissa and current along the ordinate ). When the junction is biased in a reverse direction with respect to the base, the curve proceeds from point B to point C in a manner indicating a fairly high resistance region similar to conventional diodes. At point C, however, breakdown takes place whereupon the current suddenly increases as the voltage drops slightly. This voltage drop may be exaggerated because of supply source internal resistance. The breakdown, from point C to point D on the curve, represents a negative resistance region. At point D the curve again assumes a positive slope out to point E. It should be emphasized that curve 50 is merely illustrative of a typical device and that even with a plurality of devices manufactured in exactly the same way as far as normal manufacturing tolerances permit, the curve may vary somewhat in detail but not in character. Some experimental devices jump from point D to point E′ on curve 50′, the latter having a much higher slope representing less resistance than that for the slope portion DE. After reaching point E′, a decrease in voltage causes the current to decrease along line 50′ to a point near the origin where this curve merges with curve 50. In general, a majority of the devices constructed followed curve 50 while a yet significant proportion of the devices displayed curves falling somewhere between curve 50 and curve 50′. For achieving the results illustrated in FIGURE 4, only one of the modified junctions is required since the other is not used; for example, junction 42 may be omitted. Such a device is illustrated schematically in FIGURE 4*a* to include wafer 30, base lead 48 connected thereto, and junction 42 formed from modifier material 43 from which lead 44 projects.

FIGURE 5 serves to illustrate a unique aspect of the present invention; in this instance, modified junctions 38 and 42 both are employed. To produce this figure, the potential supply source is connected across leads 40 and 44 while base lead 48 is open; this then is a characteristic of double diode form of operation in which the base is not utilized and therefore may be omitted as illustrated schematically in FIGURE 5*a* to include wafer 30 on which are located junctions 38 and 42, each the same as in FIGURE 2, but without a base connection. In FIGURE 5, the voltage on one junction with respect to the other is plotted along the abscissa while the current flowing into the one junction is plotted along the ordinate. Here again, the characteristics of a large number of devices vary from one to another in matters of degree but not in basic shape. In the first quadrant, curve 52 indicates that a low resistance path exists between the two junctions for most applied voltages. The same is true in the third quadrant except that the direct-current flow is reversed in direction. The interesting portions of these curves are the humps 53 and 54 observed at low current values in each of the first and third quadrants. Curve 55, having corresponding humps 56 and 57, illustrates the curves obtained with a number of the devices wherein the magnitude of the humps is quite substantial. It will be observed that, as the voltage is increased in magnitude away from the origin, the curve first follows a relatively low current path indicating a high resistance out to point 53 (or 54, 56 or 57) after which there is a breakdown whereupon the curve jumps to a locus nearly parallel to and lying along the side the ordinate indicating a very low resistance condition. After switching at the peak of the hump, the device remains in its on-condition as long as the current remains above a sustaining value for which the corresponding voltage may be termed the "hold on" voltage $V_H$ (curve 52) or $V_{H'}$ (curve 55). This switching characteristic in the double-diode mode of operation is symmetrical in that it occurs in both the first and third quadrants as plotted in the biaxial presentation of FIGURE 5.

In the preferred form of the invention, control of the switching characteristic is achieved by means of a bias current applied to the base 34. A family of curves are displayed in FIGURE 6 depicting this three-terminal mode of operation of the device, both junctions being formed with the modified pellets of the invention as illustrated in FIGURE 2. In this figure, the ordinate and abscissa represent the same parameters as in FIGURE 5, except that the abscissa represents a much greater range of voltage amplitudes. For a base current equal to zero, curve 57 is of the same character as curves 52 or 55 of FIGURE 5. When the base is biased with a current tending to bias the emitter reversely with respect to the base, the switching action is delayed; the higher the base current, the greater the potential that must be applied between the collector and the emitter to effect switching from the high-resistance state to the low-resistance state. In FIGURE 6, the curve family labelled $I_{b2}$ represents a greater base current than that for the family indicated $I_{b1}$. It will be noted that the path, shown in dotted lines because the switching speed renders it difficult to observe accurately, of the characteristic travels a different course when the device switches from off to on than when it switches in a reverse direction. The characteristic thus includes what may be termed a hysteresis loop. The curves are substantially symmetrical; a similar characteristic is obtained regardless of the polarity of one junction with respect to the other. The particular junction operated with a reverse bias is called the collector while the other junction is termed the emitter; either junction may serve as either electrode.

The curves illustrated are produced by coupling a constant-current source 60 between the base B and the junction serving as the emitter E as depicted in FIGURE 7. A unidirectional (D.C.) potential source 61 is coupled through a resistor 62 between the emitter and the other junction which serves as the collector C. The sudden drop in collector-emitter voltage observed in several of the characteristic curves when the device is switched to an on-condition is exaggerated by the voltage drop across resistor 62 in response to the high current flow in the circuit.

In operation, the device switches between its on and off states very quickly; this switching speed has been observed to be between less than 0.02 and 0.2 microsecond for devices such as those for which examples are given below. In general, the voltage necessary to hold the device in its on-condition once switched to that condition is in the neighborhood of one volt for the exemplary devices. FIGURE 8 displays curves of the variant in switching speed found to exist in a pair of illustrative devices having both junctions formed from the modified material. Curve *a* depicts the switching speed vs. the trigger voltage $V_{ce}$ at which switching occurred when using a small unit manufactured as above with a 0.075″ x 0.075″ x 0.0025″ wafer. Curve *b* is similar but is taken with a unit having the larger size wafer described above. In general, the switching time has been found to be greater with the larger units; this is believed to be due to the larger collector area and base thickness which results in greater collector capacitance. As illustrated, the switching time has also been found to be inversely proportional to the switching voltage required. Smaller units have displayed switching times of substantially less than 0.02 microsecond.

In theory, it appears that the switching action is the result of carriers injected at the junction functioning as an emitter and multiplied at the other junction. To begin with, when a positive bias is applied to the base of the three-terminal unit having an n-type base and two modified junctions, by connecting constant-current generator 60 between base and emitter for example, both the emitter and collector are biased in the reverse direction and no carriers are injected by the emitter. The base current $I_b$ is split into an emitter current $I_e$ and a collector current $I_c$. When the voltage on the collector with respect to the emitter is increased negatively, the collector current $I_c$ increases while the emitter current $I_e$ decreases; the amount of collector current increase is a function of the reverse-bias diode-characteristic slope of both junctions. As the emitter current decreases, so does the magnitude of the emitter reverse bias with respect to the base until at some point the emitter becomes biased forwardly with respect to the base whereupon carriers injected by the emitter are multiplied at the collector and returned to the emitter through the external circuitry driving the emitter even more positive. Consequently, an abrupt switching action to a high-current low-resistance condition occurs. The base acts like the grid in a thyratron; increasing the base current delays the switching action; that is, an increased base current requires a greater collector voltage to obtain switching action. The properties exhibited by the devices and which are believed necessary to thyratron action include a current gain greater than one and good injection efficiency. Experimental results seem to indicate that the switching occurs when the collector current approximately equals the base current. When the collector voltage and base current are adjusted such that the device is operating just short of the switching point, illumination with visible light is sufficient to initiate the switching action; the device returns to its off-condition upon removal of the illumination. When the device is operating adjacent the switching point, only a very small trigger voltage is required to change the switching state.

An interesting set of characteristic curves is obtained when two-modified-junction devices of the invention are operated in a three-terminal common base circuit as illustrated in FIGURE 9*a*. The emitter E is connected through a high resistance 69 to the positive terminal of a battery 70, the negative terminal of the latter being connected to the base B. Collector C is connected through a load resistor 71 to the negative terminal of a battery 72 the positive terminal of which is connected to base B. The polarities illustrated are for units having an n-type base.

A biaxial presentation is depicted in FIGURE 9*b* wherein collector current $I_c$ is plotted along the ordinate and the voltage $V_{CB}$ of the collector with respect to the base is plotted along the abscissa. FIGURE 9*b* includes a family of curves, each curve representing a different value of emitter current $I_e$ in the circuit of FIGURE 9*a*. When the emitter current is zero, there is a discontinuity in the reverse diode curve as in FIGURE 4. As the emitter current is increased, the discontinuity is enhanced and the curves split into two sections corresponding to an on section "*b*" and an off section "*a*." The device switches from the off curves to the on curves whenever the collector voltage magnitude exceeds a certain threshold value, this value increasing with increases of the emitter bias current. When the collector voltage is lowered in magnitude back below the critical threshold value, the device switches back to the off state. Measurements indicate that at low values of collector voltage, to the right of the discontinuities shown in FIGURE 9*b*, the current gain is less than one. At values of collector voltage falling to the left of the discontinuity, the current gain is greater than one, usually being of the order of 2 to 5.

FIGURE 9*c* illustrates the effects of temperature changes on the operation of the two-modified-junction devices of the present invention. In this figure, which depicts the temperature characteristic for a three-terminal form of the device connected in the common-emitter mode, base current $I_b$ is plotted along the ordinate. The voltage $V_{CES}$ necessary to trigger the device is plotted along the abscissa. The three curves illustrate the performance at three different temperatures and demonstrate that a larger base current is required to obtain the same switching voltage at a higher temperature. At least for devices operated at a low base current, temperature stabilization may be achieved by connecting the base to the collector, in the common emitter mode, through a high resistance which has a positive temperature coefficient matching the negative temperature coefficient of the device.

In accordance with an alternative embodiment of the present invention the emitter junction is but a conventional rectifying barrier while the collector junction is formed from the modified material as previously described. The resultant device in this case displays switching characteristics very similar to those described above but only in the one quadrant of a biaxial representation of the characteristics in which the collector is negative with respect to the emitter. A typical such alternative junction is formed by alloying a pellet of indium with n-type germanium. A minor quantity of gallium may be included to improve the injection efficiency of the emitter for minority carriers. The technique for actually forming the junction is identical with that described above for junctions 38 and 42.

FIGURE 10 displays the diode characteristic of the alternative simple diode emitter. This characteristic is entirely conventional, indicating a high resistance with the emitter reverse biased and a low resistance under the opposite bias condition.

FIGURE 11 displays the characteristics of this alternative device under operating conditions corresponding to those of the preferred device as displayed in FIGURE 5. Operation in the third quadrant is substantially identical with that previously discussed, while in the first quadrant there is no switching action and the device exhibits a high resistance since in this quadrant the emitter is reverse biased. The base is not here used and may therefore be omitted from the structure which is schematically illustrated in FIGURE 11*a* to include wafer 30 having junction 42 on one side as before but with a conventional p-n junction 65 on the other and from which projects a lead 66.

FIGURE 12 illustrates the action of the alternate unit with a bias applied to the base to provide three-terminal operation as compared with the two-terminal operation depicted in FIGURE 11. The alternative device displays switching characteristics in the third quadrant quite similar to those shown in FIGURE 6 with respect to the device of the preferred embodiment of the invention. In the first quadrant however, the device exhibits only a high resistance. FIGURE 12*a* schematically illustrates the device and is identical to FIGURE 11*a* except for the addition of base lead 48 connected to wafer 30.

A number of examples are given below for the manufacture of devices in accordance with the invention. Devices according to each of these examples have been made and tested and have been found to display the switching characteristics described above. Certain of the exemplary compositions were utilized time and again, as a result of which it was unqualifiedly determined that each and every one of the significant characteristics was completely reproducible. However, extensive investigation and postulation, including consultation with a number of other persons having wide experience in the field of semi-conductor technology, have failed to yield a completely provable description of the interior structure present in the devices of this invention. The behavior has been fully demonstrated and the method employed for manufacture is readily understood. Nevertheless, the physical configuration, particularly within the junction regions, is as yet uncertain. Nevertheless, the devices of the invention find great utility because of their extremely vast switching time between a very high and a very small conduction-resistance condition.

It may be helpful in understanding the present invention to consider a further characteristic of the modifier elements. It is known that different elements may be made to diffuse distances into a given semi-conductor material. The following table sets forth a few representative diffusion constants in germanium at specified temperatures for each of the elements indium, gallium, arsenic and antimony:

| Diffusion Constant, cm.$^2$/second | Temperature Degrees Centigrade | | | |
|---|---|---|---|---|
| | Indium | Gallium | Arsenic | Antimony |
| $10^{-10}$ | ---------- | ---------- | 875 | 875 |
| $10^{-12}$ | 875 | 900 | 700 | 700 |
| $10^{-14}$ | 700 | 725 | 550 | 550 |
| $10^{-16}$ | 575 | 600 | 450 | 450 |

By interpolation, it will be observed that at 600°, antimony diffuses at a greater rate into germanium than does gallium. Accordingly, for a given diffusion time, the donor antimony tends to diffuse further into a germanium body than does the acceptor gallium. Thus, for the typical device above described and with respect to which it was previously noted that gallium tends to segregate out at a greater rate than antimony during recrystallization, at the same time antimony tends to diffuse further than gallium during recrystallization of the modifiers with the base material. While segregation seems to be the predominating action, sufficient amounts of the antimony, which has a conductivity type the same as that of the germanium base of the exemplary device, is to some extent interspersed in the junction along with the gallium which has the opposite conductivity; that is, both the donor and acceptor are concurrently recrystallized with the base material and both appear in the junction region. In this light, the process of forming the junction may be described as that of simultaneously diffusing the one modifier having the same conductivity as the wafer and segregating the other modifier having the opposite conductivity from the liquefied pellet material into recrystallization with the wafer material.

Numerous circuit applications for the present devices will readily come to the mind of a person skilled in the art. The fast switching time coupled with a high ratio between the slopes of on and off portions of the characteristic curves render the devices most attractive for inclusion in a number of otherwise well known switching circuits. The devices have been found to be very suitable for horizontal scanning deflection circuitry in television receivers where high speed, low dissipation at high currents when in the on-condition, and high off-resistance are necessary.

A simple two-terminal oscillator may be had by utilizing the discontinuity in the reversed-biased diode characteristic of a junction formed in accordance with the present invention. As shown in FIGURE 13, a parallel combination of a resistor 74 and a variable capacitor 75 is connected at one end to the base B. The other end of the parallel combination is connected to one terminal of a battery 76, the other terminal of which is connected to the collector C; the negative terminal of the battery is connected to the collector of the unit in which wafer 30 is of n-type material. The emitter terminal E of the device is not included in the circuit and may be omitted from the structure entirely if desired. In operation, the circuit oscillates at a frequency determined by the time constant of the RC network.

FIGURE 14 is similar to FIGURE 13 except that an alternating current source 77 is connected between emitter E and collector C. Emitter E may be either of a modified form in accordance with the present invention or a conventional p-n junction. In operation the oscillator synchronizes with the applied A.C. voltage from source 77 the frequency of which is similar to that, corresponding to the RC time constant of the circuit.

The circuit of FIGURE 15 is similar to that of FIGURE 13 except that capacitor 75 is connected between the collector and emitter. In operation, this circuit operates as a relaxation oscillator the frequency of which is determined by the proportion of R to C.

The thyratron characteristics of the three-terminal form of the device find ready application in trigger circuits. Monostable, astable and/or bistable circuits are all achievable with but a minimum number of components. A circuit capable of operating under any of these conditions is illustrated in FIGURE 16*a*. Base B is connected through a resistor 80 and battery 81 to collector C, battery 81 being polarized to bias the collector negatively with respect to the n-type base. Emitter E is connected through a load resistor 82 and a battery 83 to the collector.

FIGURE 16*b* is similar to FIGURE 6, the device in this case also being one having both junctions modified in accordance with the present invention. The magnitude of resistance 82 and the voltage magnitude of battery 83 determines the slope of the operating load lines $R_L$ as is well understood in the art for conventional transistors. The load line $R_L$ falls in either the first or third quadrants depending upon the polarity with which battery 83 is inserted in the emitter-collector circuit. Of course, battery 83 may be replaced by a conventional voltage divider network providing a range of available potentials including both polarities. By changing the value of load resistor 82, the position of the load line may be changed with respect to the family of characteristic curves. Depending upon the point or points at which the load line cuts any particular curve, the circuit may be either monostable, astable, or bistable.

In the examples now to be given of materials utilized in forming the modified junctions of the present invention, each exemplary junction is formed in accordance with the techniques set forth above. Wafer 30 is of n-type germanium having a resistivity of about 10 ohm-centimeters and is 0.075" square and 0.0025" thick.

The following table sets forth the percentages by weight of various illustrative compositions of modifier pellets which when alloyed to n-type germanium form the junctions of the present invention:

(1) 0.5% gallium, 2.5% antimony, the balance indium
(2) 1% gallium, 2.5% antimony, balance indium
(3) 0.5% gallium, 2.5% antimony, balance indium and tin in a 1:1 weight ratio
(4) 1% gallium, 10% antimony, balance indium
(5) 1% gallium, 5% antimony, balance indium
(6) 1% gallium, 20% antimony, balance indium
(7) 0.5% gallium, 2.5% arsenic, balance indium
(8) 1% gallium, 5% antimony, balance tin
(9) 0.5% gallium, 5% antimony, balance indium
(10) 0.5% gallium, 10% antimony, balance indium
(11) 20% gallium, 80% antimony Numerous other compositions of percentages intermediate those given have been utilized successfully.

Particularly with gallium-antimony mixtures as in the preferred embodiment, some difficulty may be encountered in attempting to alloy the junctions to germanium. This difficulty may arise when the proportion of antimony is high because the pellet is then extremely brittle and thus may be easily fractured and, in addition, substantially higher temperatures are required. On the other hand, with a high proportion of gallium the pellet is almost liquid at room temperature and the process is more critical of control because of increased alloying activity due to the excessive amount of gallium. By compromising the proportions, as in example device No. 11, devices employing only these two modifier elements have been made and found to operate as described. To avoid such criticality, the two modifiers are preferably incorporated, as noted above, in a carrier such as indium or tin or a mixture of both. The carrier must dissolve germanium and preferably has a segregation constant less than either of the modifiers.

When utilizing the indium-gallium-arsenic mixtures, the reverse resistance of the junctions generally is comparatively low and higher base currents are usually required to trigger or switch the device than is the case with pellets which contain an equal amount of antimony in place of the arsenic.

Representing operation of the three-terminal form in a circuit such as that illustrated in FIGURE 7 in which resistor 62 has the value of 1000 ohms, the table below sets forth certain operational characteristics found to exist with devices constructed in accordance with some of the above exemplary modifier compositions. In this table, the first column at the left indicates which pellet composition was employed by a number corresponding to the numbers utilized in the above list of different compositions. Column 2 lists different switching voltages at which the base current was as indicated in column 3. The off-resistance is listed in column 4 and the hold-on voltage $V_H$ is listed in column 5. In all cases, the resistance presented by the device in the on-condition was of the order of one ohm.

| No. | $V_{Switching}$, Volts | $I_b$, ma. | $r_{off}$, Ohms | $V_H$, Volts |
|---|---|---|---|---|
| 1 | 7.0<br>16.0<br>27.0<br>50.0 | 0.100<br>0.290<br>0.500<br>1.000 | 30,000 | 0.75 |
| 9 | 7.0<br>14.0<br>30.0 | 0.38<br>0.62<br>1.18 | 33,000 | 0.75 |
| 10 | 7.5 | 6.0 | ---------- | ---------- |

The off-resistance and hold-on voltage for the device of Example 10 were not recorded but were observed to be approximately the same as for the devices of Examples 1 and 9. The device of Example 2 displayed values comparable to those for the device of Example 1; similarly, the devices of Examples 3 and 7 displayed values similar to those for the devices of Examples 9 and 10, respectively.

It has been shown that the present invention in its broadest sense is directed to a unique alloy junction which may be employed as the only semi-conductive junction in a device useful for example as discussed with respect to FIGURE 13. On the other hand, a device having overall symmetrical characteristics is produced by forming two such junctions on a semi-conductor wafer. Different operational characteristics may be obtained depending upon what combination of the different possible varieties of electrodes are included. The different operational characteristics have been discussed for a device having either one or two of the modified junctions together with either one or no conventional junctions and for any of these combinations with or without a base connection. In all cases, an essential feature of the device lies in the existence of a sharp discontinuity in the characteristic curve as a result of which the device in use serves as a switch subject to change its conducting condition in response to a variation in a control current or voltage or serves as an oscillator element by reason of its negative resistance.

In the preferred three-terminal form of the invention with both junctions of the modifier type, a most complete versatility of operation is offered to the circuit designer. A most useful characteristic of the preferred form of the device is its thyratron action whereby once switched to the on-condition, its resistance drops to a very low value; yet, the voltage at which switching occurs may be controlled by changing the current to the control electrode. The device of the present invention may be manufactured with the very same apparatus conventionally employed for making present day alloy junction transistors. Moreover, the techniques involved in the manufacturing of the device of this invention are conventional per se and therefore require little if any special instruction to workmen who are already familiar with the manufacture of conventional alloy-junction transistors.

While particular embodiments of the present invention have been shown and described, it will be obvious to those skilled in the art that changes and modifications may be made without departing from the invention in its broader aspects. Accordingly, the aim in the appended claims is to cover all such changes and modifications as fall within the true spirit and scope of the invention.

I claim:

1. A semi-conductor device having a gas-discharge type switching characteristic and comprising: a body of extrinsic n-type germanium; a first junction on a first surface of said body and formed by alloying with said body a material comprising a first modifier of n-type conductivity and a second modifier of p-type conductivity with said second modifier having a segregation constant in said germanium body greater than that of said first modifier and a diffusion rate in said body material lower than that of said first modifier; and a second junction on a second surface of said body spaced from said first surface, formed by alloying with said body a material comprising a first modifier of n-type conductivity and a second modifier of p-type conductivity with said second modifier having a segregation constant in said germanium body greater than that of said first modifier and a diffusion rate in said body material lower than that of said first modifier.

2. A semi-conductor device as defined in claim 1 in which said second junction is disposed directly opposite said first junction.

3. A semi-conductor device as defined in claim 1 in which said second modifier for forming each of said first and second junctions is gallium, and said first modifier for forming each of said first and second junctions is an element selected from the group consisting of antimony and arsenic.

4. A semi-conductor device having a gas-discharge type switching characteristic and comprising: a body of extrinsic n-type germanium; a first junction on a first surface of said body and formed by alloying with said body a material comprising a first modifier of n-type conductivity and a second modifier of p-type conductivity with said second modifier having a segregation constant in said germanium body greater than that of said first modifier and a diffusion rate in said body material lower than that of said first modifier; a second junction on a second surface of said body spaced from said first surface, formed by alloying with said body a material comprising a first modifier of n-type conductivity and a second modifier of p-type conductivity with said second modifier having a segregation contant in said germanium body greater than that of said first modifier and a diffusion rate in said body material lower than that of said first modifier; and an electrode electrically joined to a third surface of said body spaced from said first and second surfaces.

5. A semi-conductor device having a gas-discharge type switching characteristic and comprising: a body of extrinsic semi-conductive material of predetermined conductivity type and having a resistivity greater than about seven ohm-centimeters; a first alloy-junction, formed from a material comprising a carrier in which said body material is soluble at alloying temperatures and further comprising a first modifier of a conductivity type opposite said predetermined type and a second modifier of said predetermined type with said second modifier having a segregation constant in said body material lower than that of said first modifier and a diffusion rate in said body material greater than that of said first modifier, on a first surface of said body; and an electrode electrically joined to a second surface of said body spaced from said first surface.

6. A semi-conductor device having a gas-discharge type switching characteristic and comprising: a body of extrinsic semi-conductive material of predetermined conductivity type and having a resistivity greater than about seven ohm-centimeters; a first alloy-junction, formed from a material comprising a carrier in which said body material is soluble at alloying temperatures and further comprising a first modifier of a conductivity type opposite said predetermined type and a second modifier of said predetermined type with said second modifier having a segregation constant in said body material lower than that of said first modifier and a diffusion rate in said body material greater than that of said first modifier, on a first surface of said body; a diode-junction on a second surface of said body spaced from said first surface; and an electrode electrically joined to a third surface of said body spaced from said first and second surfaces.

7. A semi-conductor device having a gas-discharge type switching characteristic and comprising: a body of extrinsic semi-conductive material of predetermined conductivity type and having a resistivity greater than about seven ohm-centimeters; a first alloy-junction, formed from a material comprising a carrier in which said body material is soluble at alloying temperatures and further comprising a first modifier of a conductivity type opposite said predetermined type and a second modifier of said predetermined type with said second modifier having a segregation constant in said body material lower than that of said first modifier and a diffusion rate in said body greater than that of said first modifier, on a first surface of said body; and a diode-junction on a second surface of said body spaced from said first surface.

8. A semi-conductor device having a gas-discharge type switching characteristic and comprising: a body of extrinsic semi-conductive material of predetermined conductivity type; a first alloy-junction, formed from a material comprising as a majority constitutent by weight a carrier in which said body material is soluble at allowing temperatures and further comprising a first modifier of a conductivity type opposite said predetermed type and a second modifier of said predetermined type with said second modifier having a segregation constant in said body material lower than that of said first modifier and a diffusion rate in said body greater than that of said first modifier, on a first surface of said body; and a second alloy-junction, formed from a material comprising a carrier in which said body material is soluble at alloying temperatures and further comprising a first modifier of a conductivity type opposite said predetermined type and a second modifier of said predetermined conductivity type with said second modifier having a segregation constant lower than that of said first modifier and a diffusion rate in said body greater than that of said first modifier, on a second surface of said body spaced from said first surface.

9. A semi-conductor device as defined in claim 8 in which said second alloy-junction is disposed directly opposite said first alloy-junction region.

10. A semi-conductor device having a gas-discharge type switching characteristic and comprising: a body of extrinsic semi-conductive material of predetermined conductivity type; a first alloy-junction, formed from a material comprising as a majority constituent by weight a carrier in which said body material is soluble at alloying temperatures and further comprising a first modifier of a conductivity type opposite said predetermined type and a second modifier of said predetermined type with said second modifier having a segregation constant in said body material lower than that of said first modifier and a diffusion rate in said body material greater than that of said first modifier, on a first surface of said body; a second alloy-junction, formed from a material comprising a carrier in which said body material is soluble at alloying temperatures and further comprising a first modifier of a conductivity type opposite said predetermined type and a second modifier of said predetermined conductivity type with said second modifier having a segregation constant lower than that of said first modifier and a diffusion rate in said body material greater than that of said first modifier, on a second surface of said body spaced from said first surface; and an electrode electrically joined to a third surface of said body spaced from said first and second surfaces.

11. A semi-conductor device having a gas-discharge type switching characteristic and comprising: a body of extrinsic semi-conductive material of predetermined conductivity type; a first alloy junction, formed from a material comprising a carrier in which said body material is soluble at alloying temperatures and further comprising a first modifier of a conductivity type opposite said predetermined type and a second modifier of said predetermined type with said second modifier having a segregation constant in said body material lower than that of said first modifier and with said carrier being a third modifier having a segregation constant in said body material lower than that of said first modifier, on a first surface of said body; and an electrode electrically joined to a second surface of said body spaced from said first surface.

12. A semi-conductor device as defined in claim 11 in which said carrier has a segregation constant in said body material lower than that of said second modifier.

13. A semi-conductor device having a gas-discharge type switching characteristic and comprising: a body of extrinsic n-type germanium having a resistivity greater than about seven ohm-centimeters; a first alloy junction, formed from a material comprising a carrier in which said germanium is soluble at alloying temperatures and further comprising a first modifier of p-type conductivity and a second modifier of n-type conductivity with said second modifier having a segregation constant in said germanium lower than that of said first modifier and a diffusion rate in said body material greater than that of said first modifier, on a first surface of said body; and an electrode electrically joined to a second surface of said body spaced from said first surface.

14. A semi-conductor device as defined in claim 13 in which said carrier is a material selected from the group consisting of indium, tin, and mixtures of indium and tin.

15. A semi-conductor device as defined in claim 14 in which said first modifier is gallium and said second modifier is an element selected from the group consisting of antimony and arsenic.

16. A semi-conductor device as defined in claim 15 in which said material from which said alloy junction region is formed is composed by weight of from 0.5 to 1%, inclusive, of said first modifier and from 2.5% to 20%, inclusive, of said second modifier with said carrier constituting the balance.

17. A semi-conductor device having a gas-discharge type switching characteristic and comprising: a body of extrinsic semi-conductive material of predetermined conductivity type; first and second alloy junctions disposed on respective first and second spaced surfaces of said body and each formed from a material comprising a carrier in which said body material is soluble at alloying temperatures and further comprising a first modifier of a conductivity type opposite said predetermined type and a second modifier of said predetermined type with said second modifier having a segregation constant in said body material lower and a diffusion rate in said body material greater than those of said first modifier.

18. A semi-conductor device having a gas-discharge type switching characteristic and comprising: a body of extrinsic semi-conductive material of predetermined conductivity type; first and second alloy junctions disposed respectively on first and second spaced surfaces of said body and each formed from a material comprising a carrier in which said body material is soluble at alloying temperatures and further comprising a first modifier of a conductivity type opposite said predetermined type and a second modifier of said predetermined type with said second modifier having a segregation constant in said body material lower and a diffusion rate in said body material higher than those of said first modifier; and an electrode electrically joined to a third surface of said body spaced from said first and second surfaces.

19. A semi-conductive device having a gas-discharge type switching characteristic and comprising: a body of extrinsic semi-conductive material of a predetermined conductivity type and having a resistivity greater than about seven ohm-centimeters; a junction on a first surface of said body and formed by simultaneously diffusing into said body a first modifier, having a conductivity of said predetermined type, and segregating a second modifier, having a conductivity opposite said predetermined type with a segregation constant greater and a diffusion rate in said body material lower than those of said first modifier, from a liquid material comprising said first and second modifiers into a recrystallizer junction region having said first and second modifiers interspersed therein; and an electrode electrically joined to a second surface of said body spaced from said first surface.

20. In a semi-conductor system having a gas-discharge characteristic, the combination comprising: a body of extrinsic semi-conductive material of predetermined conductivity type having a resistivity greater than about seven ohm-centimeters; a junction on a first surface of said body and formed by alloying with said body a material comprising a first modifier having a conductivity of said predetermined type and a second modifier having a conductivity opposite said predetermined type with a segregation constant greater and a diffusion rate in said body material lower than those of said first modifier; an electrode electrically joined to a second surface on said body spaced from said first surface; and means for biasing said junction in a reverse direction enabling current flow through said junction exhibiting said gas-discharge characteristic.

21. A system as defined in claim 20 in which said material includes a carrier in which said body is soluble at alloying temperatures and which constitutes a major proportion of said material by weight.

22. In a semi-conductor system having a gas-discharge characteristic, the combination comprising; a body of semiconductive material of predetermined conductivity type; first and second alloy junctions disposed on respective first and second spaced surfaces of said body and each formed from a material comprising a first modifier of said conductivity type and a second modifier of the opposite conductivity type with said second modifier having a segregation constant in said body greater and a diffusion rate in said body lower than those of said first modifier; and means for reverse biasing one of said first and second junctions enabling current flow through said one junction exhibiting said gas-discharge characteristic.

23. A system as defined in claim 22 in which said material includes a carrier in which said body is soluble at alloying temperatures and which constitutes a major proportion of said material by weight.

24. In a semi-conductor system having a gas-discharge characteristic, the combination comprising: a body of semi-conductive material of predetermined conductivity type; first and second alloy junctions disposed on respective first and second spaced surfaces of said body and each formed from a material comprising a first modifier of said conductivity type and a second modifier of the opposite conductivity type with said second modifier having a segregation constant in said body greater and a diffusion rate in said body lower than those of said first modifier; means for reverse biasing one of said first and second junctions enabling current flow through said one junction exhibiting said gas-discharge characteristic; and an electrode electrically joined to a third surface of said body spaced from said first and second surfaces.

25. A system as defined in claim 24 in which said material includes a carrier in which said body is soluble at alloying temperatures and which constitutes a major proportion of said material by weight.

26. In a semi-conductor system having a gas-discharge characteristic, the combination comprising: a body of extrinsic conductive material of predetermined conductivity type and having a restivity greater than about seven ohm-centimeters; a junction on a first surface of said body and formed by alloying with said body a material comprising a first modifier having a conductivity of said predetermined type and a second modifier having a conductivity opposite said predetermined type with a segregation constant greater and a diffusion rate in said body material lower than those of said first modifier; an electrode electrically joined to a second surface of said body spaced from said first surface; means for reversed biasing said junction enabling current flow therethrough exhibiting said gas-discharge characteristic; and a diode contact electrically joined to a second surface of said body spaced from said first surface.

27. A system as defined in claim 26 in which said material includes a carrier in which said body is soluble at alloying temperatures and which constitutes a major proportion of said material by weight.

References Cited in the file of this patent

UNITED STATES PATENTS

| | | |
|---|---|---|
| 2,725,315 | Fuller | Nov. 29, 1955 |
| 2,829,422 | Fuller | Apr. 8, 1958 |
| 2,836,521 | Longini | May 27, 1958 |
| 2,840,497 | Longini | June 24, 1958 |
| 2,842,723 | Koch et al. | July 8, 1958 |
| 2,842,831 | Pfann | July 15, 1958 |
| 2,849,664 | Beale | Aug. 26, 1958 |
| 2,855,334 | Lehovec | Oct. 7, 1958 |
| 2,856,320 | Swanson | Oct. 14, 1958 |
| 2,883,313 | Pankove | Apr. 21, 1959 |
| 2,907,969 | Seidensticker | Oct. 6, 1959 |
| 3,010,857 | Nelson | Nov. 28, 1961 |

OTHER REFERENCES

Radio Corporation of America (Great Britain), 751,408, June 27, 1956, 317–235.